(12) United States Patent
Zhou et al.

(10) Patent No.: US 7,581,163 B1
(45) Date of Patent: Aug. 25, 2009

(54) DETECTION OF CORRUPTED MEMORY POINTERS WITHIN A PACKET-PROCESSING DEVICE

(75) Inventors: Aibing Zhou, Santa Clara, CA (US); Dongping Luo, Fremont, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 660 days.

(21) Appl. No.: 11/445,369

(22) Filed: Jun. 1, 2006

(51) Int. Cl.
*G06F 11/00* (2006.01)
(52) U.S. Cl. .................................. 714/805; 714/819
(58) Field of Classification Search ................ 714/805, 714/819
See application file for complete search history.

(56) References Cited

U.S. PATENT DOCUMENTS

| | | | | |
|---|---|---|---|---|
| 5,195,181 A | * | 3/1993 | Bryant et al. | 709/215 |
| 5,315,707 A | * | 5/1994 | Seaman et al. | 710/56 |
| 5,428,766 A | * | 6/1995 | Seaman | 709/215 |
| 5,463,732 A | * | 10/1995 | Taylor et al. | 345/505 |
| 5,852,719 A | * | 12/1998 | Fishler et al. | 709/216 |
| 6,052,753 A | * | 4/2000 | Doerenberg et al. | 710/305 |
| 7,502,870 B1 | * | 3/2009 | Chu | 709/250 |

* cited by examiner

*Primary Examiner*—Stephen M Baker
(74) *Attorney, Agent, or Firm*—Shumaker & Sieffert, P.A.

(57) ABSTRACT

Techniques are described for detecting corruption of buffer pointers passed between a local processor and a remote processor on a network device. For example, the first processor, which may be a memory controller, receives and stores packets within memory. A second processor, such as a host processor for the network device, is coupled to the first processor by a bus. The first processor communicates a memory pointer associated with an a given packet to the second processor for processing of the packet, and maintains a backup copy of the memory pointer. Upon receiving the memory pointer back from the second processor, the first processor compares at least a portion of the memory pointer received from the second processor with an equivalent portion of the copy of the memory pointer to determine whether the received memory pointer has been corrupted.

24 Claims, 5 Drawing Sheets

DETECTION OF CORRUPTED MEMORY POINTERS WITHIN A PACKET-PROCESSING DEVICE

TECHNICAL FIELD

The invention relates to packet-processing devices and, in particular, to memory access in packet-processing devices having multiple processors.

BACKGROUND

In general, a network device receives and sends network packets through one or more input/output (I/O) cards. Examples of such network devices include firewalls, attack prevention devices, intrusion detection devices, acceleration devices, routers, switches, gateways, proxy servers, and intelligent hubs.

To assist and accelerate processing of the network packets, some computer network devices include multiple processors. For example, a network device may include a central processor (referred to herein as the "remote processor"), and one or more additional processors (referred to individually herein as a "local processor") that provides media access control to the network via one or more network interfaces. In such devices, when the network device receives packets, the local processor allocates an allocation block, i.e., storage space, within a local memory. This local memory may be located in close proximity to the local processor. The local processor may then temporarily store the network packet in the allocation block of local memory.

In some situations, the remote processor in the network device may need to process network packets buffered by the local processor. For example, a remote processor may need to scan the network packets to check for viruses or determine whether a network attack currently exists. In these situations, the local processor forwards at least some portion of the network packets to the remote processor. That is, the local processor may not send each packet in its entirety, but rather some small portion. In addition, the local processor may send one or more buffer pointers to the remote processor, where the buffer pointers indicate locations of the network packet in the local memory. Subsequently, if the remote processor requires additional portions of the network packets that were not transferred to the remote processor, the remote processor may use the buffer pointers to retrieve the remaining portions of the network packets from local memory. After processing the network packets, the remote processor may pass the partial network packet along with the buffer pointer back to the local processor. After performing any further processing, the local processor may forward the network packet back to an I/O card for retransmission through the network. At this time, the local processor uses the buffer pointers returned by the remote processor to deallocate the section in local memory used to store the network packet.

SUMMARY

In general, the invention is directed to techniques of detecting corruption of buffer pointers to local memory passed between a local processor and a remote processor on a computing device. In particular, during transmission between the local processor and the remote processor, or during processing at the remote processor, a buffer pointer may become corrupted. That is, one or more bits of the buffer pointer may have changed incorrectly. If the buffer pointer becomes corrupted, software processes on the local processor could write information to wrong sections of local memory. In addition, the local processor could deallocate the wrong block of local memory, which may currently store one or more different network packets. Eventually, errors in local memory caused by a corrupted buffer pointer could cause the local processor and the network device to crash, thereby disrupting service.

As described herein, a network device includes a local processor that stores copies of buffer pointers when allocating a block of local memory. The local processor may then transfer a copy of the pointer to a remote processor. Subsequently, when the remote processor returns the pointer back to the local processor, the local processor compares at least the most significant bits of the returned pointer with the stored copy of the pointer. If the copies of the pointer do not match, the local processor deems the returned pointer to be corrupted. Consequently, the local processor uses the locally stored pointer for subsequent operations, such as to deallocate the block of local memory.

For example, when a network device receives a network packet, a local processor in the network device may allocate a block in local memory to store the network packet. The local processor stores a backup copy of the memory pointer to where the network packet begins within the local memory. To process the packet, the local processor may transfer a portion of the network packet to the remote processor (e.g., a central processing unit (CPU)) via a Peripheral Component Interface (PCI). In addition to transferring the portion of the network packet to the CPU, the local processor also transfers a copy of the memory pointer to the network packet in local memory to the CPU. After the CPU finishes processing the network packet, the CPU communicates the portion of the network packet and/or the copy of the memory pointer back to the local processor. Before the local processor performs any processes on the returned network packet, the local processor compares the returned pointer with the locally-stored pointer. If the most significant bits of the memory pointer do not match, the local processor drops the network packet and uses the locally-stored copy of the pointer to deallocate the block in local memory holding the network packet. In this way, local memory and the stability of the local processor are not compromised due to corruption of a pointer passed between the local processor and the CPU.

In one embodiment, a method comprises communicating a memory pointer from a first processor of a network device to a second processor, wherein the memory pointer addresses a packet in a local memory of with the first processor. The method further comprises maintaining, using the first processor, a locally-stored copy of the memory pointer, receiving the memory pointer back from the second processor, and comparing at least a portion of the memory pointer received from the second processor with an equivalent portion of the locally-stored copy of the memory pointer. The method further comprises determining that the received memory pointer has been corrupted when the portion of the received memory pointer does not match the equivalent portion of the locally-stored copy of the memory pointer; and using the locally-stored copy of the memory pointer instead of the received memory pointer when the received memory pointer has been corrupted.

In another embodiment, a network device comprises a network interface to receive a packet. The network device further includes a first processor to store the packet within a memory, and a second processor coupled to the first processor by a bus. The first processor communicates a memory pointer associated with the packet to the second processor for processing of the packet, and maintains a copy of the memory pointer. Upon receiving the memory pointer back from the second processor, the first processor compares at least a portion of the memory pointer received from the second processor with an equivalent portion of the copy of the memory pointer to determine whether the received memory pointer has been corrupted.

In another embodiment, a memory controller comprises a memory pointer queue to maintain a locally-stored copy of a memory pointer to data within a local memory. A memory access module receives a memory pointer from a second processor, and determines whether at least a portion of the received memory pointer matches an equivalent portion of the locally-stored copy of the memory pointer. A memory manager to use the locally-stored copy of the memory pointer to deallocate the block in the local memory when the portion of the received memory pointer does not match the equivalent portion of the locally-stored copy of the memory pointer.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
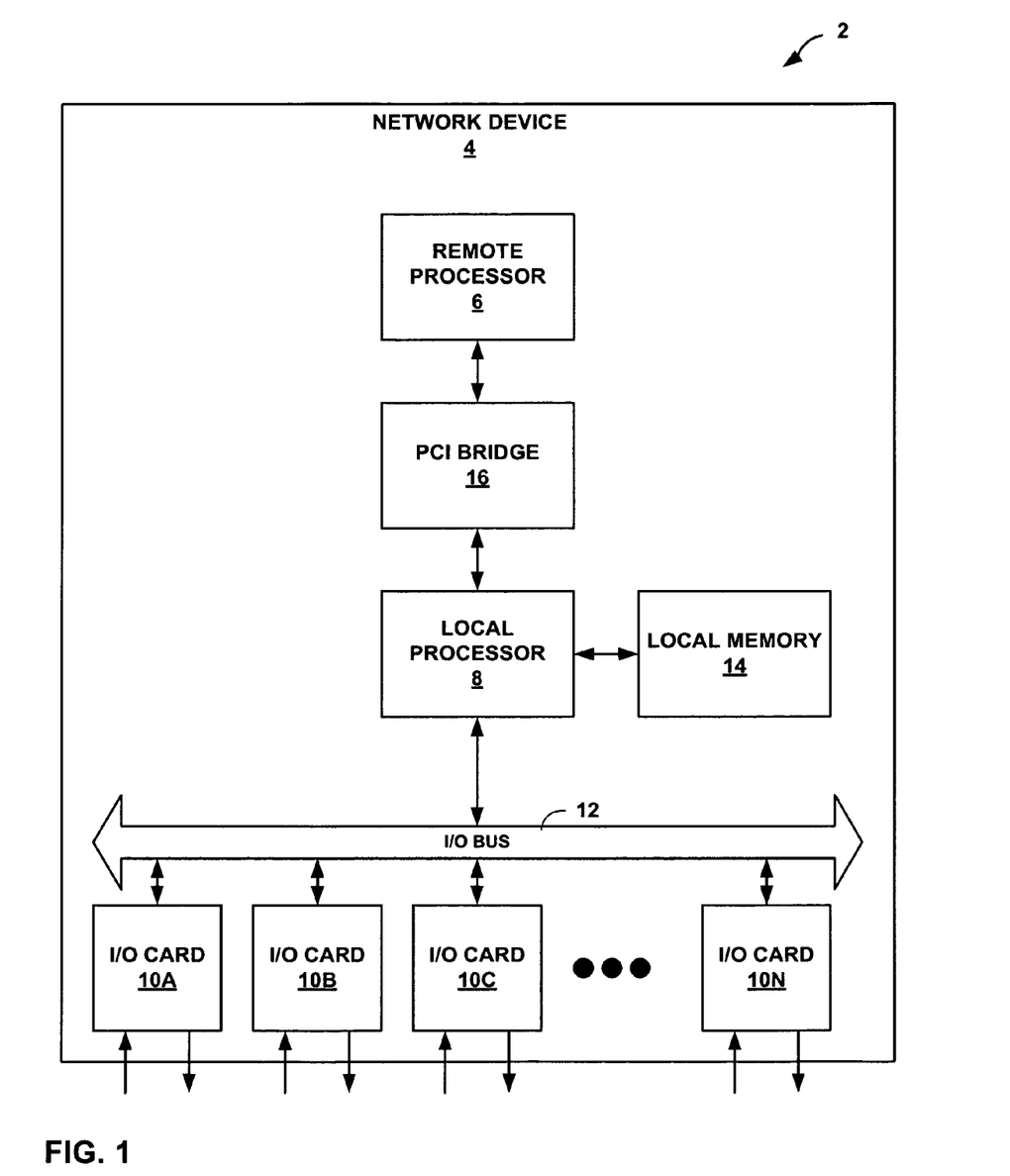
FIG. 1 is a block diagram illustrating an exemplary system in which a network device uses the techniques of this invention to detect corruption of memory pointers communicated between processors of the network device.

FIG. 1 is a block diagram illustrating an exemplary system 2 in which a network device 4 uses the techniques described herein to detect corruption of a memory pointer passed between a remote processor 6 and a local processor 8 of the network device. Network device 4 may be one of a variety of types of network device having multiple processors to process network packets. For instance, network device 4 may be a firewall device, a network attack detection device, an intrusion detection device, an acceleration device, a router, a switch, a gateway, a proxy server, or an intelligent hub.

Network device 4 includes input/output (I/O) cards 10A through 10N (collectively, I/O cards 10) that provide media access control (MAC) hardware to receive and send packets on one or more networks according to one or more types of interfaces. For example, I/O cards 10 could be Ethernet cards, ATM cards, fiber interfaces, cable or digital subscriber line (DSL) interfaces or other interface supporting network-based communications. The term "packet" is used herein to generally describe a unit of data communicated between resources in conformance with a communication protocol. The principles of the invention may be readily applied to a variety of protocols, such as the Transmission Control Protocol (TCP), the User Datagram Protocol (UDP), the Internet Protocol (IP), Asynchronous Transfer Mode (ATM), Frame Relay, and the like. Accordingly, "packet" is used to encompass any such unit of data, and may be interchanged with the term "cell," or other similar terms used in such protocols to describe a unit of data communicated between resources within the network.

When one of I/O cards 10 receives a network packet, the I/O card forwards the network packet to local processor 8 via an I/O bus 12. In one embodiment, local processor 8 may be a memory controller and, in the context of network device 4, local processor 8 may be a packet direct memory access (PDMA) engine responsible for coordinating packet communication between I/O cards and remote processor 6. Local processor 8 may be implemented as a general-purpose processor, embedded processor, digital signal processor (DSP), microcontroller, field programmable gate array (FPGA), application specific integrated circuit (ASIC) or similar hardware, firmware and/or software for implementing the control techniques described herein.

If implemented in software, a computer-readable storage medium may store computer readable instructions, i.e., program code, that can be executed by a processor or DSP to carry out one of more of the techniques described above. For example, the computer-readable storage medium may comprise random access memory (RAM), read-only memory (ROM), non-volatile random access memory (NVRAM), electrically erasable programmable read-only memory (EEPROM), flash memory, or the like.

Upon receiving a network packet from one of I/O cards 10, local processor 8 allocates a block in a local memory 14, which represents any data memory for which local processor 8 has primary control. Local memory 14 may be on-chip memory (e.g., SRAM) located within the local processor or off-chip memory (e.g., DRAM) accessible directly from local processor 8 via a memory interface (as shown). Local processor 8 may allocate a fixed amount (e.g., a two kilobyte block) or a packet-length dependent amount of space of local memory 14 in which to store the network packet. Local processor 8 then retrieves the packet from I/O card 10A, in this example, and stores the network packet within this allocated block of local memory 14.

In allocating the block of local memory 14 and storing the network packet, local processor 8 retains a pointer to the beginning memory address of the network packet within the two kilobyte block of local memory 14. Local processor 8 retains a backup copy of this pointer.

After local processor 8 stores the copy of this pointer, local processor 8 forwards at least a portion of the network packet to remote processor 6 via a Peripheral Component Interface (PCI) bus 16. For instance, as a PDMA engine, local processor 8 may forward the header portion of the network packet and a tag that includes directions and status information for the network packet, including a copy of the memory pointer to the block of local memory 14 that stores the particular network packet.

After receiving the portion of the network packet and its associated tag, remote processor 6 may process the network packet. For instance, remote processor 6 may perform an action based on content of the network packet. For example, if network device 4 is a network attack detection device, remote processor 6 may determine whether the network packet is part of a network flow, and whether that flow contains a network attack. During processing, remote processor 6 may require all or part of the remaining portion of the network packet not sent to the remote processor. To retrieve this information, remote processor 6 interacts with local processor 8 as a PDMA engine, and uses the pointer included in the tag to retrieve the required information from local memory 14.

During processing, remote processor 6 may alter the content of the network packet. For example, remote processor 6 may add or remove information to/from the of the network packet. For example, if the network packet has a Multi-protocol label switching (MPLS) header, remote processor 6 could re-route the network packet by adding an extra label to the beginning of the MPLS header. This may be useful in re-routing a stream of network packets containing a network attack to a "honeypot" server. In situations where remote processor 6 alters the content of the network packet, remote processor 6 may alter the pointer in the tag of the packet due to the increased packet size. For example, if remote processor 6 adds a number of bytes to the beginning of the network packet, remote processor 6 decrements the pointer by that number of bytes.

After remote processor 6 finishes processing the network packet, local processor 8 receives the potentially modified portion of the network packet and the tag back from remote processor 6. Because the pointer in the tag may have been corrupted during transmission to or from remote processor 6 or during processing at remote processor 6, local processor 8 compares the pointer in the returned tag with the locally-stored backup copy of the pointer.

In one embodiment, local processor 8 only compares the most significant bits of the locally-stored copy of the pointer with the equivalent bits in the pointer in the returned tag. Local processor 8 may ignore the remaining eleven least significant bits because remote processor 6 may have properly changed these bits of the pointer in the returned tag.

For example, recognizing that the allocation of local memory 14 for the particular packet is bounded, remote processor 6 may not add so many bits or otherwise modify the packet so that the beginning of the network packet crosses a boundary of the two kilobyte block allocated in local memory 14 for that network packet. Thus, continuing with the 2K allocation example, assuming local memory 14 is addressed by byte, remote processor 6 may only purposefully alter the least-significant eleven bits of the pointer. For this reason, in one embodiment, local processor 8 detects pointer corruption if the most significant bits of the locally-stored backup copy of the memory pointer do not match the most significant bits of the pointer in the returned tag. In response, local processor 8 drops the packet and uses the locally-stored backup copy of the memory pointer to deallocate the block in local memory 14. Deallocating the block in local memory 14 allows local processor 8 to reuse the block of local memory for a subsequent network packet or otherwise, and use of the backup copy of the memory pointer reduces the likelihood that local memory 14 itself becomes corrupted or that software processes executing on local processor 8 become unstable.

On the other hand, if the most significant bits of the locally-stored pointer match the most significant bits of the pointer in the returned tag, local processor 8 may proceed to perform one or more processes on the network packet using the memory pointer received from remote processor 6. These processes may alter the network packet further. Ultimately, local processor 8 may send the network packet to one of I/O cards 10 for output to a network.

The techniques of this invention may present one or more advantages. For instance, using a locally-stored, backup copy of a memory pointer to verify that a memory pointer returned from remote processor 6 is not corrupted may diminish or eliminate the chances that local processor 8 will become unstable due to a corrupted returned pointer. This may be especially important because a crash of local processor 8 may cause network device 4 to malfunction or crash completely, thereby disrupting network service and/or exposing an enterprise to a security vulnerability. In cases where network device 4 has a mission-critical function such as network security or e-commerce, downtime associated with a crash of network device 4 may be unacceptable.

Figure 2:
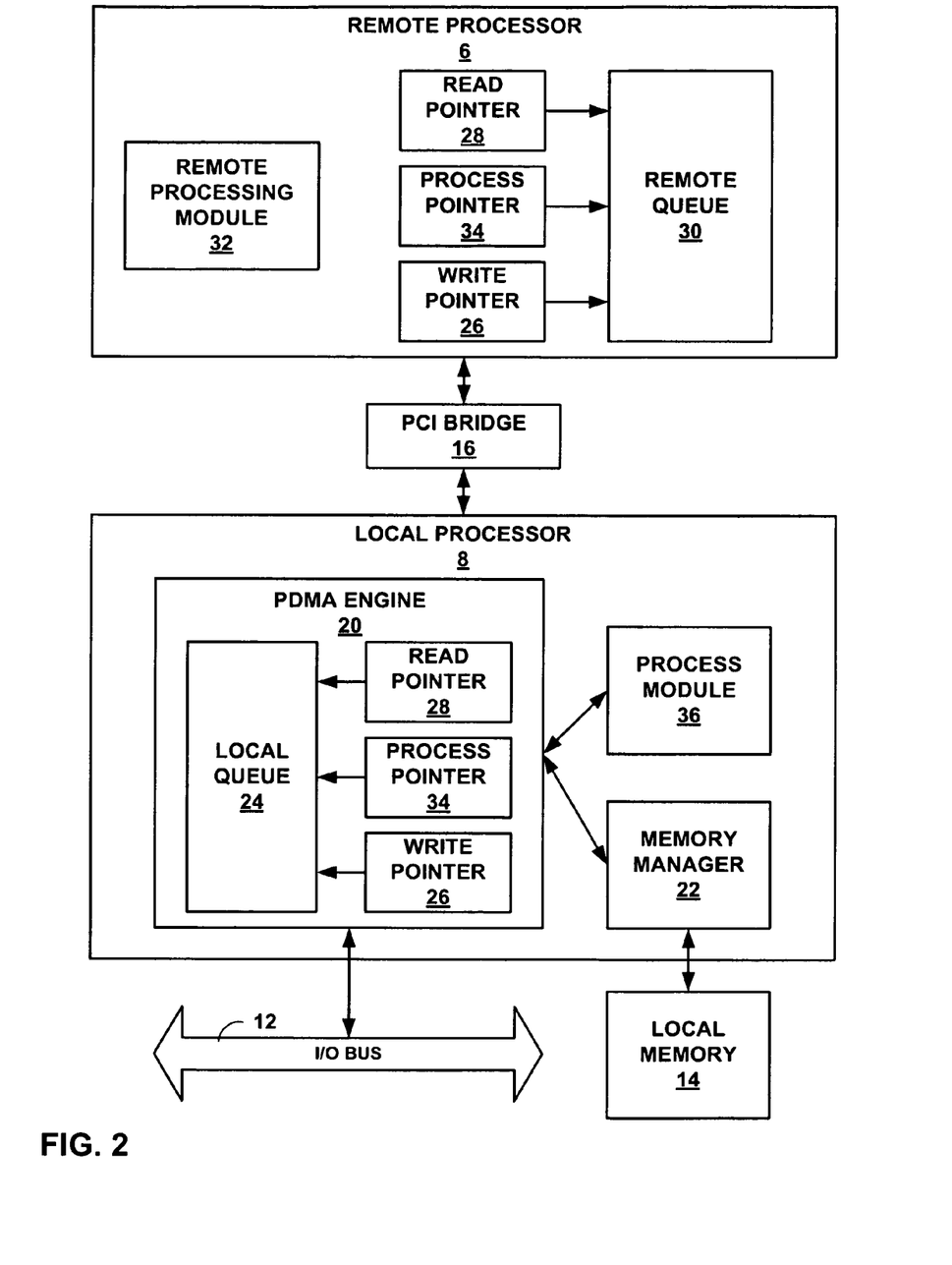
FIG. 2 is a block diagram illustrating an exemplary embodiment of a remote processor of the network device and an exemplary embodiment of a local processor of the network device.

FIG. 2 is a block diagram illustrating an exemplary embodiment of remote processor 6 of network device 2 and an exemplary embodiment of local processor 8 of network device 2. For the purposes of explanation, FIG. 1 is referenced by way of example.

In the exemplary embodiment illustrated in FIG. 2, local processor 8 comprises several components. In particular, local processor 8 includes a packet direct memory access (PDMA) module 20, e.g., PDMA engine, which may be implemented in hardware, software, firmware, or combinations thereof. When one of I/O cards 10 receives a network packet from the network and outputs the packet on I/O bus 12, PDMA engine 20 receives the network packet.

Upon receiving the network packet, PDMA engine 20 checks whether a local queue 24 within PDMA engine 20 is full. In particular, PDMA engine 20 maintains a Write Pointer 26 and a Read Pointer 28. Both PDMA engine 20 and remote processor 6 may read the values of Write Pointer 26 and Read Pointer 28. Write pointer 26 indicates the next position in local queue 24 for PDMA engine 20 to write. Read pointer 28 indicates the next position in local queue 24 for PDMA engine 20 to read. To determine whether local queue 24 is full, PDMA engine 20 determines whether the value of Write Pointer 26 plus one equals the value of Read Pointer 28. If the value of Write Pointer 26 plus one equals the value of Read Pointer 28, local queue 24 is full. To understand this, consider that if PDMA engine 20 were to write data in local queue 24 at the position indicated by Write Pointer 26 plus one when Write Pointer 26 plus one equals Read Pointer 28, PDMA engine 20 would be overwriting a position in local queue 24 that has not yet been read.

If local queue 24 is not full, PDMA engine 20 provides the network packet to a memory manager 22 with a request to allocate a block in local memory 14 for the network packet. To fulfill the request, memory manager 22 locates a free (i.e., available) block of local memory 14 (e.g., two kilobyte block), marks the block as allocated, and writes the network packet to that block. To allow data to be added to the beginning of the network packet, memory manager 22 may write the network packet several bytes after the first address of the block. Thus, the network packet "floats" within the two-kilobyte block in that it need not be stored at the beginning of the block. Memory manager 22 returns a pointer to the beginning memory address of the network packet within the allocated block of local memory 14. That is, memory manager 22 returns the address of the first byte of the network packet in local memory 14.

After receiving the pointer from memory manager 22, PDMA engine 20 stores the pointer in local queue 24 at the position indicated by Write Pointer 26. In addition, PDMA engine 20 sends a tag to remote processor 6. This tag includes the stored memory pointer, status of the packet, and requested operations/directions. Depending on the particular communication, PDMA engine 20 sends all or a portion of the network packet. PDMA engine 20 sends the tag, and possibly a portion of the packet, to remote processor 6 via a component interconnect that facilitates communication between local processor 8 and the remote processor. As illustrated in FIG. 2, this component interconnect may comprise a Peripheral Component Interconnect (PCI) bridge coupling processors 6 and 8.

When remote processor 6 receives the tag from local processor 8, remote processor 6 places the tag in a remote queue 30 at the position indicated by Write Pointer 26. Remote queue 30 contains the same number of positions as local queue 24. Thus, if local queue 24 contains 128 positions, then remote queue 30 also contains 128 positions. Furthermore, because remote queue 30 contains the same number of positions as local queue 24, a pointer to a position in remote queue 30 also indicates an equivalent position in local queue 24, and vice versa.

After the tag is inserted in remote queue 30 at the position indicated by Write Pointer 26, PDMA engine 20 increments Write Pointer 26 by one. In this way, Write Pointer 32 continues to indicate the next position in local queue 24 for PDMA engine 20 to write.

A remote processing module 32 periodically checks whether there is an unprocessed tag in remote queue 30. In particular, remote processing module 32 maintains a Process Pointer 34. Both PDMA engine 20 and remote processing module 32 may read Process Pointer 34. Process Pointer 34 indicates the next position for remote processing module 32 to process. To detect that there is a tag in remote queue 30 to process, remote processing module 32 determines whether Write Pointer 26 equals Process Pointer 34. If Write Pointer 26 equals Process Pointer 34, remote processing module 32 has processed all tags written to remote queue 30. However, if Write Pointer 26 does not equal Process Pointer 34, remote processing module 32 has not processed all tags written to remote queue 30. Hence, there is an unprocessed tag in remote queue 30.

When remote processing module 32 detects that there is an unprocessed tag in remote queue 30, remote processing module 32 reads the tag at the position of remote queue 30 indicated by Process Pointer 34. After reading the tag, remote processing module 32 may perform one or more functions on the network packet associated with the tag. For example, remote processing module 32 may scan the network packet for a network attack. Other example operations include replicating, encrypting, tunneling, rewriting or performing other operations on the packet. If, during processing, remote processing module 32 requires additional portions of the network packet, remote processing module 32 may use the pointer in the tag to indirectly access local memory 14 via PCI bridge 16 and local processor 8.

After remote processing module 32 completes processing of the tag, remote processing module 32 places the processed tag in remote queue 30 at the position indicated by Process Pointer 34. Thus, remote processing module 32 overwrites the original tag in remote queue 30. Remote processing module 32 then increments Process Pointer 34 by one. In this way, Process Pointer 34 continues to indicate the next tag for remote processing module 32 to process.

PDMA engine 20 periodically checks whether remote processing module 32 has completed processing any tags. In particular, PDMA engine 20 determines whether the value of Read Pointer 28 equals the value of Process Pointer 34. If the value of Read Pointer 28 equals the value of Process Pointer 34, this indicates to PDMA engine 20 that the next tag in remote queue 30 for PDMA 20 to read is also the next tag in remote queue 30 for remote processing module 32 to process. Hence, remote processing module 32 has not processed any tags that PDMA engine 20 has not read.

If PDMA engine 20 detects that remote processing module 32 has completed processing a tag, PDMA engine 20 retrieves the tag in remote queue 30 indicated by Read Pointer 28. In addition, PDMA engine 20 also retrieves the pointer in local queue 24 indicated by Read Pointer 28. PDMA engine 20 then increments Read Pointer 28 by one. In this way, Read Pointer 28 continues to indicate the next tag in local queue 24 and remote queue 30 for PDMA engine 20 to read.

After retrieving the tag from remote queue 30 and the pointer from local queue 24, PDMA engine 20 performs pointer corruption detection. For example, PDMA engine 20 determines whether a pre-defined most significant portion of the pointer in the retrieved tag matches the equivalent portion of the pointer retrieved from local queue 24. As explained above, PDMA engine 20 may determine whether bits in the received pointer that indicate a beginning address of the block of local memory 14 match equivalent bits in the locally-stored copy of the pointer.

If there is a match, PDMA engine 20 provides the tag to other modules (represented as a process module 36) that may perform one or more functions on the packet using the memory pointer supplied in the tag. For instance, process module 36 or other process modules (not shown) may rewrite, modify, scan, replicate, encrypt, tunnel, forward or perform other operations on the network packet. Ultimately, process module 36 may instruct memory manager 22 to deallocate the block in local memory 14 associated with the pointer in the retrieved tag.

On the other hand, if there is no match between the most significant portion of the memory pointer in the tag received from remote processor 6 and the backup memory pointer from local queue 24, PDMA engine 20 assumes that the pointer received from remote processor 6 has been corrupted. Consequently, PDMA engine 20 disregards any requested operation received from remote processor 6 relative to the packet, and instructs memory manager 22 to deallocate the block in local memory 14 associated with the backup pointer retrieved from local queue 24. PDMA engine 20 does not provide the tag to process module 34 for further processing or retransmission. In this way, PDMA engine 20 "drops" the network packet associated with the tag.

Figure 3:
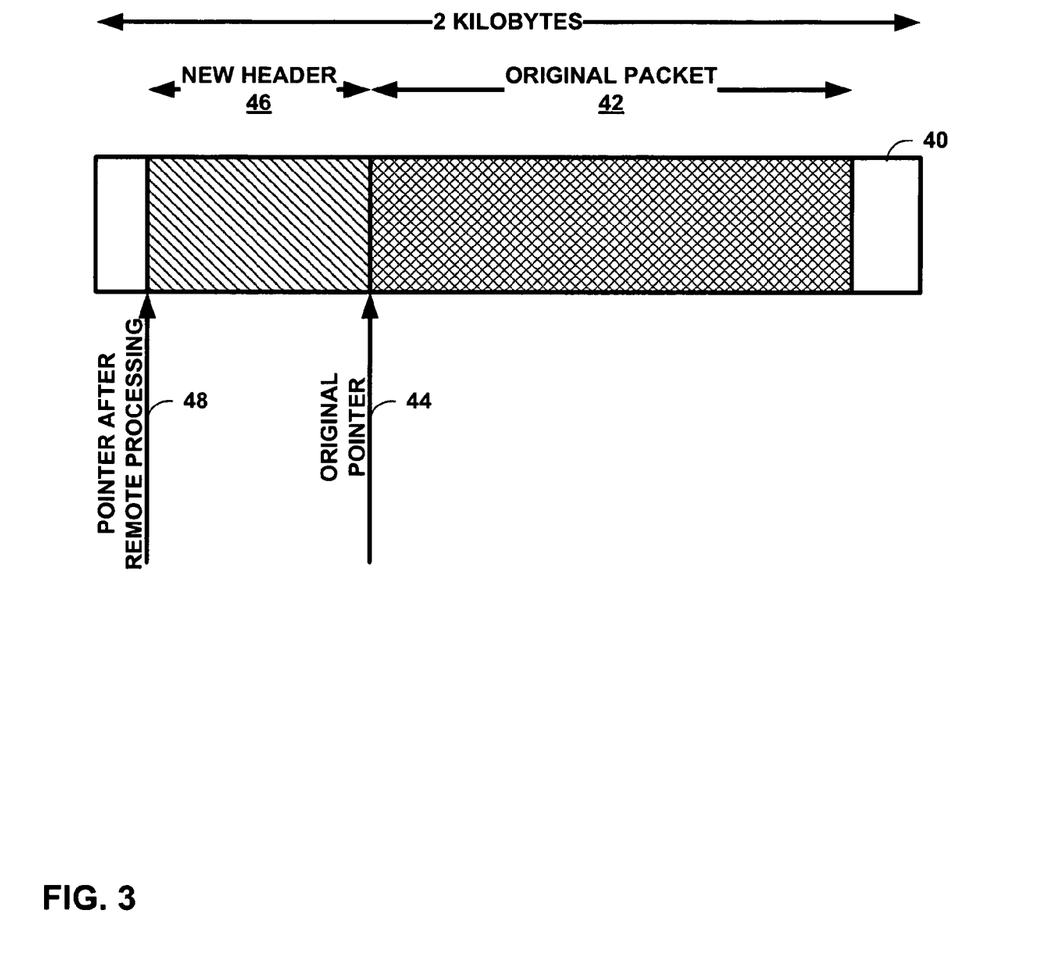
FIG. 3 is a block diagram illustrating a block of local memory used to store a network packet.

FIG. 3 is a block diagram illustrating a block 40 in local memory 14 used to store a network packet. For purposes of explanation, continuing reference may be made to FIG. 1 and FIG. 2.

When PDMA engine 20 requests that memory manager 22 allocate a block in local memory 14 for a network packet 42, memory manager 22 allocates a two kilobyte block, such as block 40 in local memory 14. Memory manager 22 may then write network packet 42 into block 40. Note that memory manager 22 is not required to write network packet 42 onto a boundary of block 40. Original pointer 44 marks the first byte of network packet 42. After writing network packet 42, memory manager 22 may return original pointer 44 to PDMA engine 20 for subsequent use.

Subsequently, remote processor 6 may add new header information 46 to the beginning of network packet 42. In this case, remote processor 6 decreases the value of original pointer 44 to create a pointer after remote processing 48. Pointer after remote processing 48 marks the first byte of network packet 42 with new header information 46.

Figure 4:
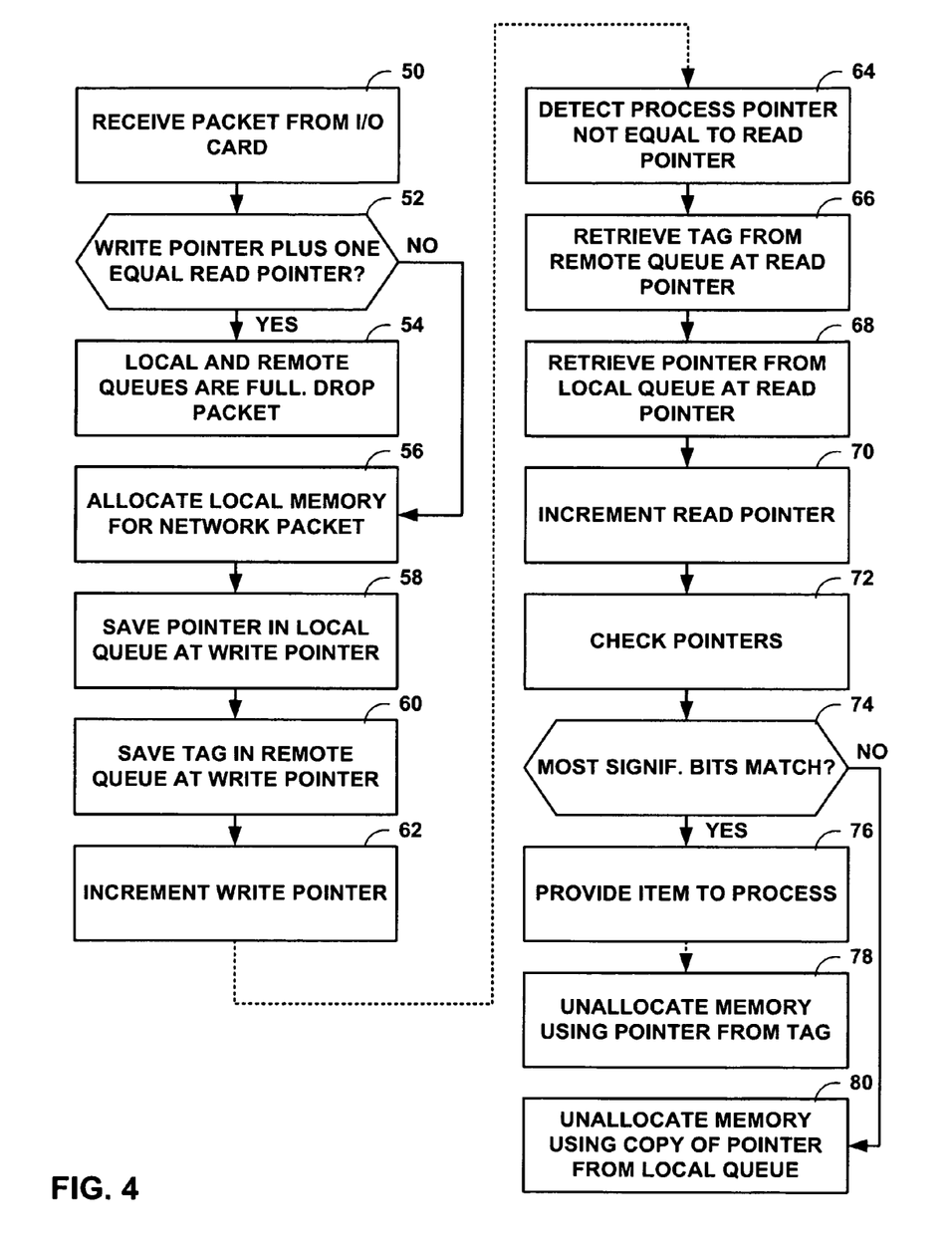
FIG. 4 is a flowchart illustrating an exemplary process performed by a local processor of the network device.

FIG. 4 is a flowchart illustrating an exemplary process of local processor 8 on network device 4. For purposes of explanation, continuing reference may be made to the preceding figures.

Initially, PDMA engine 20 in local processor 8 receives a network packet from one of I/O cards 10 via I/O bus 12 (50). After receiving the network packet, PDMA engine 20 checks whether Write Pointer 26 plus one equals Read Pointer 28 (52). If Write Pointer 26 plus one equals Read Pointer 28 ("YES" of 52), local queue 24 and remote queue 30 are full. Because local queue 24 and remote queue 30 are full, PDMA engine 20 has nowhere to store the network packet for processing. Hence, PDMA engine 20 may drop the network packet (54).

On the other hand, if Write Pointer 26 plus one does not equal Read Pointer 28 ("NO" of 52), PDMA engine 20 instructs memory manager 22 to allocate a block of local memory 14 for the network packet (56). PDMA engine 20 saves the pointer to the network packet in local memory 14 to local queue 24 at the location indicated by Write Pointer 26 (58). PDMA engine 20 then sends to remote processor 6 a tag containing a memory pointer to a packet, status information for the packet, and optionally directions for processing the packet to be stored in remote queue 30 at Write Pointer 26 (60). After the tag is written to remote queue 30, PDMA engine 20 increments Write Pointer 26 (62).

Subsequently, PDMA engine 20 may detect that Process Pointer 34 is not equal to Read Pointer 28 (64). When PDMA engine 20 detects that Process Pointer 32 is not equal to Read Pointer 28, PDMA engine 20 retrieves a tag from the position of remote queue 30 indicated by Read Pointer 28 (66). After receiving the tag from remote queue 30, PDMA engine 20 uses Read Pointer 28 to retrieve a backup copy pointer from local queue 24 (68). PDMA engine 20 then increments Read Pointer 28 (70).

PDMA engine 20 then checks whether the most significant bits of the memory pointer of the tag received from remote queue 30 match the equivalent bits of the backup pointer retrieved from local queue 24 (72). If remote processor 6 returns the packets out of order, then PDMA engine 20 may either scan all of the backup pointers for a match, use all or a portion of the most significant bits as a hash for indexing the queue or other suitable technique for determining whether a match exists.

In any case, if the most significant bits match ("YES" of 74), PDMA engine 20 provides the tag received from remote processor 6 to process module 36 (76). Subsequently, local processor 8 uses the memory pointer in the tag to deallocate the block in local memory 14 associated with the pointer (78). On the other hand, if the most significant bits do not match ("NO" of 74), PDMA engine 20 instructs memory manager 22 to deallocate the block in local memory 14 associated with the backup memory pointer retrieved from local queue 24 (80). In one embodiment, PDMA engine 20 does not forward the tag to process module 34, and effectively "drops" the network packet associated with the tag.

Figure 5:
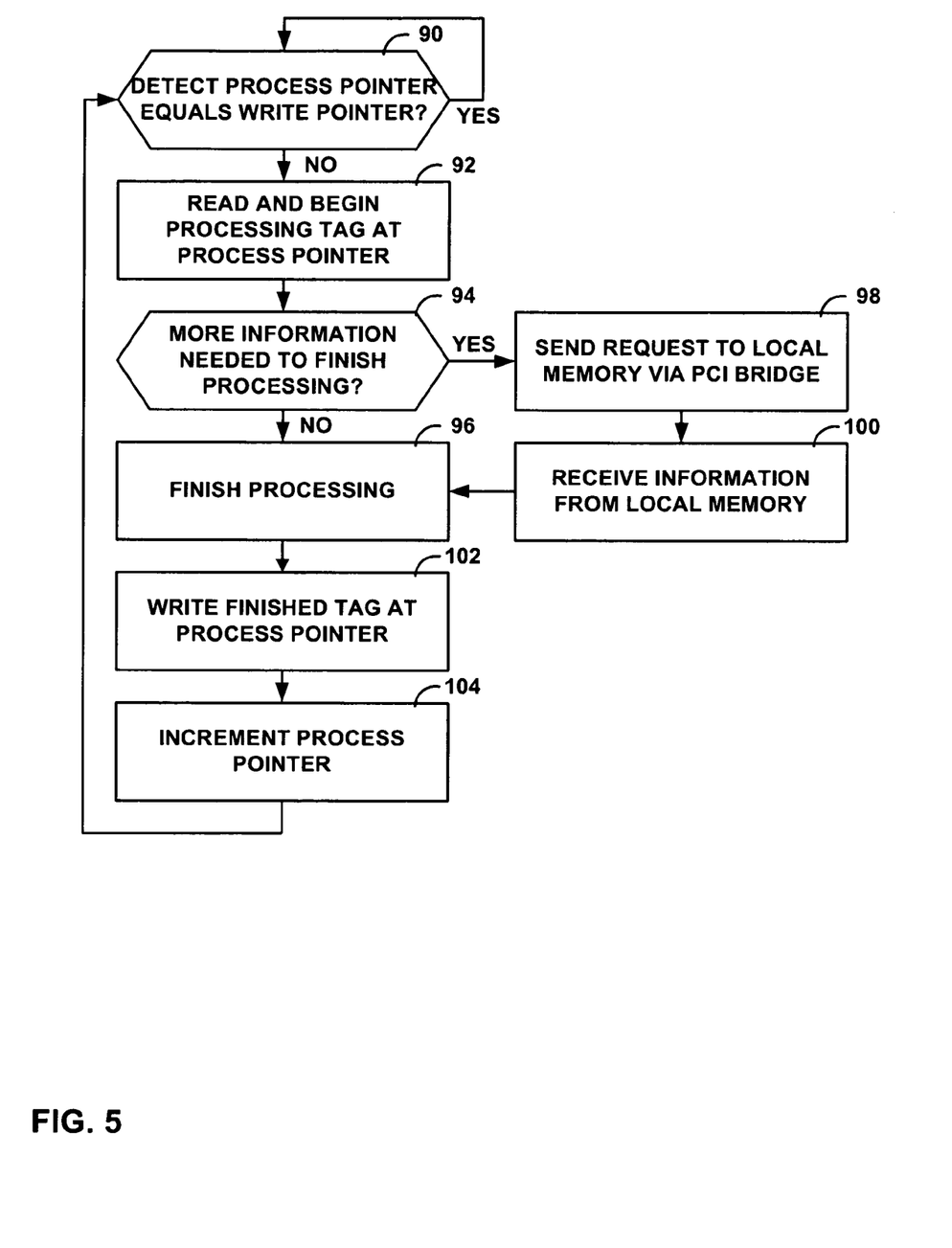
FIG. 5 is a flowchart illustrating an exemplary process of a remote processor of the network device.

FIG. 5 is a flowchart illustrating an exemplary process of remote processor 6 of network device 4 (FIG. 1). For the purpose of explanation, continuing reference is made to the preceding figures.

Initially, remote processing module 32 in remote processor 6 detects whether Process Pointer 34 equals Write Pointer 26 (90). That is, remote processing module 32 checks whether remote queue 30 contains a tag that remote processing module 32 has not yet processed. If Process Pointer 34 equals Write Pointer 26 ("YES" of 90), remote processing module 32 waits and then checks again whether Process Pointer 34 equals Write Pointer 26 (90). On the other hand, if Process Pointer 34 does not equal Write Pointer 26 ("NO" of 90), remote processing module 32 reads the tag from remote queue 30 indicated by Process Pointer 34 and begins processing the tag (92).

While processing the tag, remote processing module 32 determines whether more information from the network packet identified by the tag is needed (94). If no more information is needed ("NO" of 94), remote processing module 32 finishes processing the tag (96). Alternatively, if more information is required to process the tag ("YES" of 94), remote processing module 32 uses the memory pointer in the tag to send a request for the information from local memory 14 via PCI bridge 16 (98). Subsequently, remote processing module 32 receives the requested information from local memory 14 (100). Remote processing module 32 may then finish processing the tag (96).

After remote processing module 32 finishes processing the tag, remote processing module 32 places the tag on remote queue 30 at the position indicated by Process Pointer 34 (102). Remote processing module 32 then increments Process Pointer 34 (104).

Various embodiments of the invention have been described. Nevertheless, it is understood that there are many other embodiments. For instance, network device 4 may be a server, a firewall device, a personal computer, a router, a network intrusion detection appliance, an acceleration device or another type of network device having multiple processors that apply operations to packets. These and other embodiments are within the scope of the following claims.

The invention claimed is:

1. A computer-implemented method comprising:
communicating a memory pointer from a first processor of a network device to a second processor, wherein the memory pointer addresses a packet in a local memory of the first processor;
maintaining, using the first processor, a locally-stored copy of the memory pointer;
receiving the memory pointer back from the second processor;
comparing at least a portion of the memory pointer received from the second processor with an equivalent portion of the locally-stored copy of the memory pointer;
determining that the received memory pointer has been corrupted when the portion of the received memory pointer does not match the equivalent portion of the locally-stored copy of the memory pointer; and
using the locally-stored copy of the memory pointer instead of the received memory pointer when the received memory pointer has been corrupted.

2. The method of claim 1, wherein using the locally-stored copy of the memory pointer comprises disregarding the memory pointer received from the second processor and using the locally-stored copy of the memory pointer to deallocate the packet from the local memory when the portion of the received memory pointer does not match the equivalent portion of the locally-stored copy of the memory pointer.

3. The method of claim 1, wherein using the locally-stored copy of the memory pointer comprises disregarding the memory pointer received from the second processor and using the locally-stored copy of the memory pointer to drop the packet when the portion of the received memory pointer does not match the equivalent portion of the locally-stored copy of the memory pointer.

4. The method of claim 1, wherein maintaining a local copy of the memory pointer comprises using the first processor to insert the copy of the memory pointer into a queue of memory pointers.

5. The method of claim 4, further comprising, upon receiving the memory pointer back from the second processor, retrieving the locally-stored copy of the memory pointer from the queue for comparison with the received memory pointer.

6. The method of claim 1, wherein comparing at least a portion of the received memory pointer comprises comparing only most-significant bits of the received memory pointer and the locally-stored copy of the memory pointer.

7. The method of claim 6, wherein the most-significant bits indicate a beginning address of a block of the local memory that stores the packet.

8. The method of claim 6, wherein the second processor has purposefully added data to the packet and altered one or more least-significant bits without changing the most-significant bits.

9. The method of claim 1, further comprising:
receiving the packet from a network;
allocating a block in the local memory to store the packet;
communicating at least a portion of the packet to the second processor; and
processing the packet with the second processor using the memory pointer from the first processor.

10. The method of claim 9, wherein receiving a packet comprises receiving a packet from an Input/Output card.

11. The method of claim 9, wherein processing the packet with the second processor comprises altering the content of the packet.

12. The method of claim 9, wherein processing the packet with the second processor comprises detecting a network attack.

13. A network device comprising:
a network interface to receive a packet;
a first processor to store the packet within a memory; and
a second processor coupled to the first processor by a bus,
wherein a first processor communicates a memory pointer associated with the packet to the second processor for processing of the packet, and
wherein the first processor maintains a copy of the memory pointer and, upon receiving the memory pointer back from the second processor, comparing at least a portion of the memory pointer received from the second processor with an equivalent portion of the copy of the memory pointer to determine whether the received memory pointer has been corrupted.

14. The network device of claim 13, wherein when the portion of the received memory pointer does not match the equivalent portion of the copy of the memory pointer, the first processor uses the copy of the memory pointer instead of the received memory pointer.

15. The network device of claim 13, wherein when the portion of the received memory pointer does not match the equivalent portion of the copy of the memory pointer, the first processor uses the copy of the memory pointer to deallocate the packet from the memory.

16. The network device of claim 13, further comprising a queue maintained by the first processor to store copies of the memory pointers communicated to the second processor.

17. The network device of claim 13, wherein the network device comprises one of a network security device, a firewall, an attack prevention devices, an intrusion detection device, an acceleration device, a router, a switch, a gateway, a proxy server, or an intelligent hub.

18. The network device of claim 13, further comprising a Peripheral Component Interconnect (PCI) bridge coupling the first processor and the second processor.

19. The network device of claim 13, wherein the first processor comprises a packet direct memory access (PDMA) engine that provides access to the memory.

20. The network device of claim 13, wherein the first processor compares only most-significant bits of the received memory pointer and the locally-stored copy of the memory pointer.

21. The network device of claim 20, wherein the most-significant bits indicate a beginning address of a block of the local memory that stores the packet.

22. The network device of claim 20, wherein the second processor has purposefully added data to the packet and altered one or more least-significant bits without changing the most-significant bits.

23. A memory controller comprising:
a memory pointer queue to maintain a locally-stored copy of a memory pointer to data within a local memory;
a memory access module to receive a memory pointer from a second processor, and to determine whether at least a portion of the received memory pointer matches an equivalent portion of the locally-stored copy of the memory pointer; and
a memory manager to use the locally-stored copy of the memory pointer to deallocate the block in the local memory when the portion of the received memory pointer does not match the equivalent portion of the locally-stored copy of the memory pointer.

24. The memory controller of claim 23, wherein the memory controller comprises a packet direct access memory (PDMA) controller.

* * * * *

UNITED STATES PATENT AND TRADEMARK OFFICE
CERTIFICATE OF CORRECTION

PATENT NO. : 7,581,163 B1  Page 1 of 1
APPLICATION NO. : 11/445369
DATED : August 25, 2009
INVENTOR(S) : Zhou et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 745 days.

Signed and Sealed this

Fourteenth Day of September, 2010

David J. Kappos
*Director of the United States Patent and Trademark Office*